March 11, 1930.    G. MULLER, JR    1,750,485
COMPOUND FAUCET
Filed July 13, 1927
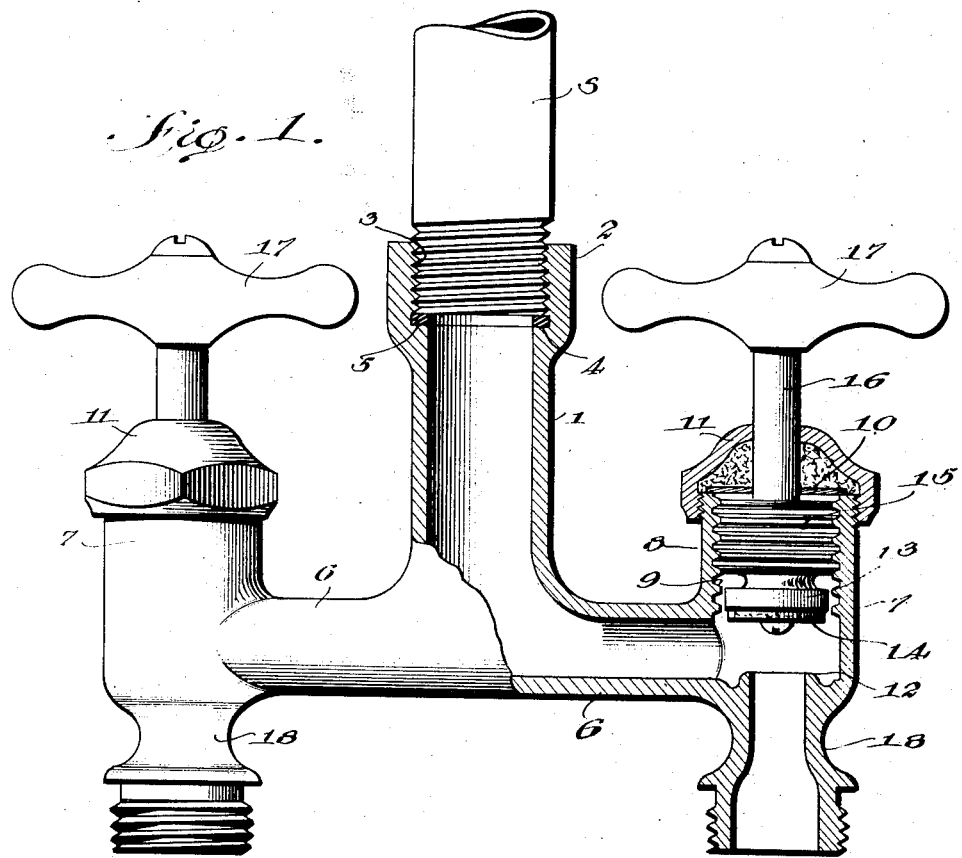
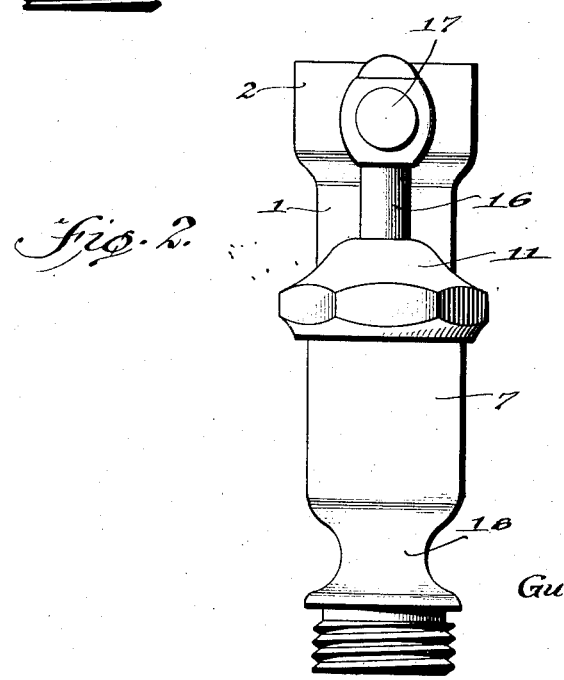
INVENTOR
Gustave Muller Jr.,
BY
ATTORNEY Patented Mar. 11, 1930

1,750,485

UNITED STATES PATENT OFFICE

GUSTAV MULLER, JR., OF JACKSONVILLE, FLORIDA

COMPOUND FAUCET

Application filed July 13, 1927. Serial No. 205,408.

The present invention relates to faucets and more particularly to compound faucets and an object of the invention is to provide a double faucet attachment to a single pipe whereby water may be drawn from one faucet while the other faucet is being used for a hose attachment.

Another object of the invention is the provision of a double faucet assembly that may be attached to a single faucet, whereby water may be drawn within the house, and the other connected with a hose whereby water may at the same time be used without the house.

With the above and other objects in view the invention consists in certain novel features of construction, arrangement and combination of parts, as will be hereinafter fully described and pointed out in the claims, reference being had to the drawing in which:—

Figure 1 is a front view partly in elevation and partly in section, of the faucet assembly, and Figure 2 is a side elevation of the same.

The faucet consists of a cylindrical tubular upstanding section 1 which forms the supply pipe and is enlarged at its upper end as at 2 and internally threaded as indicated by 3; this enlarged bore defines an annular shoulder 4 upon which is seated a gasket 5. This enlarged or counter bore portion is designed to be secured to any water supply pipe either within or outside of a house such as a spigot and in most cases it will be attached to the ordinary faucet found in most kitchens within the sinks thereof.

Extending radially from opposite sides of the main pipe 1 are the branch pipes 6—6, these pipes being in alinement, and at their outer ends they terminate in ordinary bibbs or faucets 7 which comprise the upwardly extending chambers 8 which are internally threaded as at 9, the packing glands 10, and the bonnets 11; these bibbs are also provided with valve seats 12, on which seat the valves 13 comprising the face 14, the threaded body portion 15 and the valve stem 16 carrying the handles 17 by which the valves are controlled.

Each of the bibbs have a downwardly extending nipple 18 which is threaded. It should be noted that the bore of these nipples expands at the lower portion thereof; also that the valve seats 12 are in the nature of an annular rib to receive the valve face 14.

The valves are normally closed and in such position the seats being approximately on the level of the floor of the branch pipe, the pressure from the supply pipe will aid in holding them to their seats.

In use the double faucet will be applied to a single supply pipe or faucet and water can be drawn from one side for household purposes while the opposite one is being used for a hose.

One of the principal uses for this device will be the outside connection in homes whereby a person may draw a bucket of water for washing a car or watering a flower box, while the hose is connected to the other faucet.

This device is also particularly useful in connection with lawn sprinkling, thus where in the ordinary faucets and lawn sprinklers, if it becomes necessary to draw a bucket of water, with the ordinary spigot S, it is necessary to shut off the water and disconnect the hose to draw the water and then reconnect the hose and turn on the water. Whereas with the present device, the hose connection remains open and the other bibb is opened and the bucket filled without any interruption to the lawn sprinkling.

The spigot S is threaded at its lower end so that the device may be readily applied and removed.

From the above it will be seen that I provide a double faucet with two valves available for a variety of uses.

Having thus described my invention what is claimed is:—

1. As a new article of manufacture, a compound faucet comprising an upstanding inlet pipe enlarged at its upper end and internally threaded for detachable connection with an ordinary spigot, said inlet pipe merging at its lower end into oppositely extending horizontal outlet branches, said inlet pipe and branches being in the same vertical plane, upstanding valve casings at the outer ends of said outlet branches, said casings including independently controlled vertically movable screw valves, and seats therefor, said casings extending above and below the horizontal outlet branches.

2. As a new article of manufacture, a compound faucet comprising a central vertical inlet pipe, the upper end of said pipe having a threaded counter bore, defining an annular shoulder, and a gasket seated thereon, said inlet pipe merging at its lower end in laterally projecting outlet branches, vertical valve chambers at the outer ends of said outlet branches, each chamber provided with a vertically movable screw valve independent of the other valve, and an externally threaded nipple extending downwardly from each of said chambers, said nipples independently controlled by said valves, as and for the purpose set forth.

3. A compound faucet as set forth in claim 2, characterized by the nipples having their bores expanded at their lower portions.

GUSTAV MÜLLER, Jr.